(12) United States Patent
Moon

(10) Patent No.: US 10,858,140 B2
(45) Date of Patent: Dec. 8, 2020

(54) CONTAINER CAPABLE OF FOLDING AND UNFOLDING

(71) Applicant: Jack Moon, Glebe NSW (AU)

(72) Inventor: Jack Moon, Glebe NSW (AU)

( * ) Notice: Subject to any disclaimer, the term of this patent is extended or adjusted under 35 U.S.C. 154(b) by 53 days.

(21) Appl. No.: 16/239,795

(22) Filed: Jan. 4, 2019

(65) Prior Publication Data

US 2019/0210760 A1    Jul. 11, 2019

(30) Foreign Application Priority Data

Jan. 5, 2018    (AU) ................................. 2018900037

(51) Int. Cl.
| | | |
|---|---|---|
| *B65D 5/22* | (2006.01) | |
| *B65D 5/46* | (2006.01) | |
| *B65D 25/28* | (2006.01) | |
| *B65D 5/36* | (2006.01) | |
| *B65D 6/18* | (2006.01) | |

(52) U.S. Cl.
CPC ............. *B65D 5/22* (2013.01); *B65D 5/3664* (2013.01); *B65D 5/46008* (2013.01); *B65D 5/46024* (2013.01); *B65D 25/2835* (2013.01); *B62B 2202/26* (2013.01); *B65D 7/26* (2013.01); *B65D 2571/0066* (2013.01)

(58) Field of Classification Search
CPC .... B65D 5/22; B65D 5/3664; B65D 5/46008; B65D 25/2835; B65D 5/46024; B65D 2571/0066; B65D 7/26; B65D 2575/00; B65D 2575/28; B65D 2575/30; B65D 2575/36; B65D 5/46064; B65D 25/02; B65D 25/28; B65D 71/0022; B65D 71/0029; B65D 71/0077; B65D 71/063; B65D 71/12; B65D 71/38; B65D 71/403; B65D 71/42; B65D 71/50; B65D 81/3848; B65D 2301/00; B62B 2202/26; A47J 41/00–026; A47J 2037/0777; A47G 7/063
USPC .......... 220/9.2, 62, 62.1; 229/117.09, 117.14, 229/117.15
See application file for complete search history.

(56) References Cited

U.S. PATENT DOCUMENTS

| | | | | |
|---|---|---|---|---|
| 698,266 | A * | 4/1902 | Elliott .................. | B65D 5/2009 229/113 |
| 1,997,343 | A * | 4/1935 | Quagliotti .......... | B65D 5/46136 229/117.15 |
| 2,875,943 | A * | 3/1959 | Cooper ................ | B65D 5/008 229/114 |
| 3,377,015 | A * | 4/1968 | Moreno ................ | B65D 5/18 229/110 |

(Continued)

*Primary Examiner* — Kareen K Thomas
(74) *Attorney, Agent, or Firm* — Michael J. Foycik, Jr.

(57) ABSTRACT

A flat pack container is capable of formation by folding of a flat panel of foldable material to form the container, the flat panel having an inner surface and an outer surface. A first portion of the flat panel is capable of forming a base of the container and has at least one peripheral fold line. Extending from the at least one peripheral fold line is a second portion which co operates with the base to form a wall of the container. The wall of the container includes at least two foldable pleated regions which enable the wall to be set in upright attitude to define with the base an internal space: the second portion further including flaps which retains the container in its folded configuration.

3 Claims, 10 Drawing Sheets

(56) References Cited

U.S. PATENT DOCUMENTS

| | | | | |
|---|---|---|---|---|
| 4,017,019 | A | * | 4/1977 | Booth .................... B65D 5/106 |
| | | | | 229/113 |
| 5,284,294 | A | * | 2/1994 | Floyd .................... B65D 5/248 |
| | | | | 229/117.15 |
| 5,423,478 | A | * | 6/1995 | Roosa ................ B65D 5/46104 |
| | | | | 229/114 |
| 6,062,466 | A | * | 5/2000 | Itey .................... B65D 5/46128 |
| | | | | 229/103.3 |
| 7,740,139 | B2 | * | 6/2010 | Cook ................ B65D 21/0238 |
| | | | | 206/194 |
| 2013/0105563 | A1 | * | 5/2013 | Lee ...................... B65D 5/3628 |
| | | | | 229/186 |
| 2014/0231494 | A1 | * | 8/2014 | Yang .................... B65D 5/2047 |
| | | | | 229/108 |
| 2014/0339227 | A1 | * | 11/2014 | Chalifoux ............ B65D 5/6667 |
| | | | | 220/7 |

* cited by examiner

CONTAINER CAPABLE OF FOLDING AND UNFOLDING

CROSS REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The field of the present invention relates to containers.

BACKGROUND OF THE INVENTION

It is a problem in the art to provide a container capable of folding and unfolding. There are in existence a variety of reusable liners and disposable containers used for a variety of purposes. Typically, these may be moulded in plastic or cellulose fibre material. These are also in existence a variety which conform to a particular shape of container but remain rigid; or they can be made from a flexible material which can naturally conform to a shape of a container. Liners can be used to protect surfaces, particularly internal surfaces of container. Alternatively, an outer container can be protected by using an inner container, preferably conforming to the shape of an internal surface of the wall of such outer container.

An internal container might, for instance, be filled with paint such that the liner is sacrificed in favour of the outer container. There is no currently satisfactory means to enable cooperation between a liner and container which is easily constructed, disposable and cheap to manufacture. Satisfactory cooperation entails providing an inner liner which is strong enough and sufficiently rigid enough to receive and retain fluids, protects the outer container and can be conveniently released from the outer container. A crude version of this arrangement includes use of flexible plastics which can be draped inside and over the walls of an outer container then discarded after use.

One such example is found when a plastic layer is used to cover internal walls of the container. In that example, the plastic layer protects the primary container in which the plastics layer is placed. In that case, the container is not reusable and cannot be folded. In case of painting, there is regular need to pour paint from the container in which paint is supplied into a tray which is large enough to allow use of a roller. To protect the tray, a plastic liner would be required and discarded at the end of use.

There is a need for an alternative to the known products, and there is a need for a container to contain fluids and which can also be unfolded for stacking purposes.

SUMMARY OF THE INVENTION

From the foregoing, it is seen that it is a problem in the art to provide a device meeting the above requirements. According to the invention, a container is provided to contain fluids and which can also be unfolded for stacking purposes.

The present invention further relates to a container that holds form magnetically, formed by folding generally flat and stackable sheets of material.

More particularly, the present invention relates to construction of a lined container formed by folding flat and stackable sheets of material. The invention further relates to a container including a liner and which lines an inside surface of a container and which forms a reservoir for holding fluid contents and which can be released from the container and disposed of. The invention further relates to foldable liners for containers which are single, biodegradable and biocompostable. The invention additionally relates to a cantilevered aluminium metal handle with magnets contained within a plastic shrink fraction tube which, when rotated, will allow for a 360 degree strong attachment to magnetic surfaces.

To eliminate or at least ameliorate the shortcomings of the prior art, the present invention provides an alternative to the known methods and apparatuses by providing in one form of a container formed by folding of an initially generally flat sheet of material. The present invention provides for construction of lined containers formed by folding an initially flat sheet of material into the container then lining the inside walls of the container with an impermeable layer to retain container contents such as fluids.

The invention further provides a container capable of lining an inside reservoir of an external container so the outside container can be reused and a required inner liner of the inner container discarded. The liner lines an inside surface of a container which forms a reservoir for holding fluid contents and can be released from the container and disposed of. The invention further provides foldable containers including internal liners which are single or multiple use and disposable.

In its broadest form the present invention comprises: a flat pack container capable of formation by folding of a flat layer of foldable material, the flat layer comprising a first panel forming a base of the container and including at least one peripheral edge which operates with the base to form a wall of the container, wherein the wall of the container includes at least two foldable regions which enable the wall to be set in upright attitude; the container further comprising locking flaps which retain the container in its folded configuration.

According to a preferred embodiment, an inner surface of the container is lined with a waterproof material to enable the container to retain a fluid. Preferably, the container formed from the sheet of material is insertable in a bucket or like container to form a liner for the bucket or container. Preferably, the container, prior to formation, comprises an unfolded flat sheet of material including a series of performed fold lines which dictate a folding regime to enable formation of the container. According to one embodiment, the container is formed by folding of a sheet material. The flat material includes an inner face which includes a liner and outer face which constitutes the outside of the container.

Typically, a series of flat packs are provided with a similar number of liners. The liners are built into the inner face of the container. On assembly, the liner causes the inner face of the container to become waterproof. The container is preferably manufactured from a rigid material and when folded becomes a waterproof, rigid container with the capacity to be reused many times without cleaning required between uses.

Replacement liners are available for selection when use of different materials is employed, i.e. water based, solvent based, and so on. According to one embodiment, the flat pack is constructed of lightweight recycled or other suitable materials. An external accessory tray or compartment is included with a magnet with a height adjustment facility built in to facilitate the secure attachment of a paint brush or alternate implement.

DETAILED DESCRIPTION OF THE INVENTION

Figure 1:
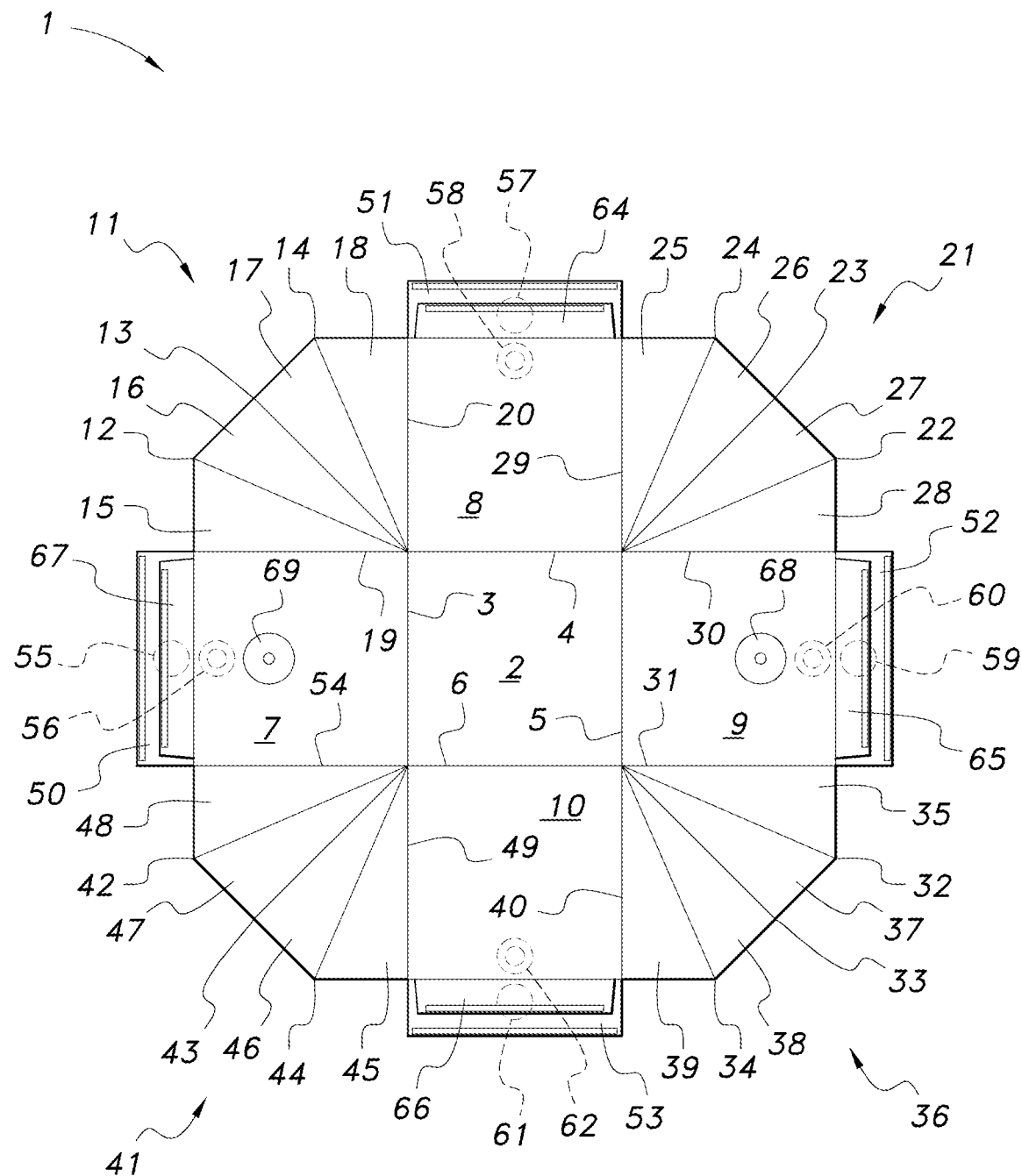
FIG. 1 shows a top plain view of a flat pack container in an open unfolded state according to one embodiment.

The present invention will now be described in more detail according to a preferred but non limiting embodiment and with reference to the accompanying illustrations wherein FIG. 1 shows a top plain view of a flat pack container 1 in an open unfolded state according to one embodiment.

Figure 2:
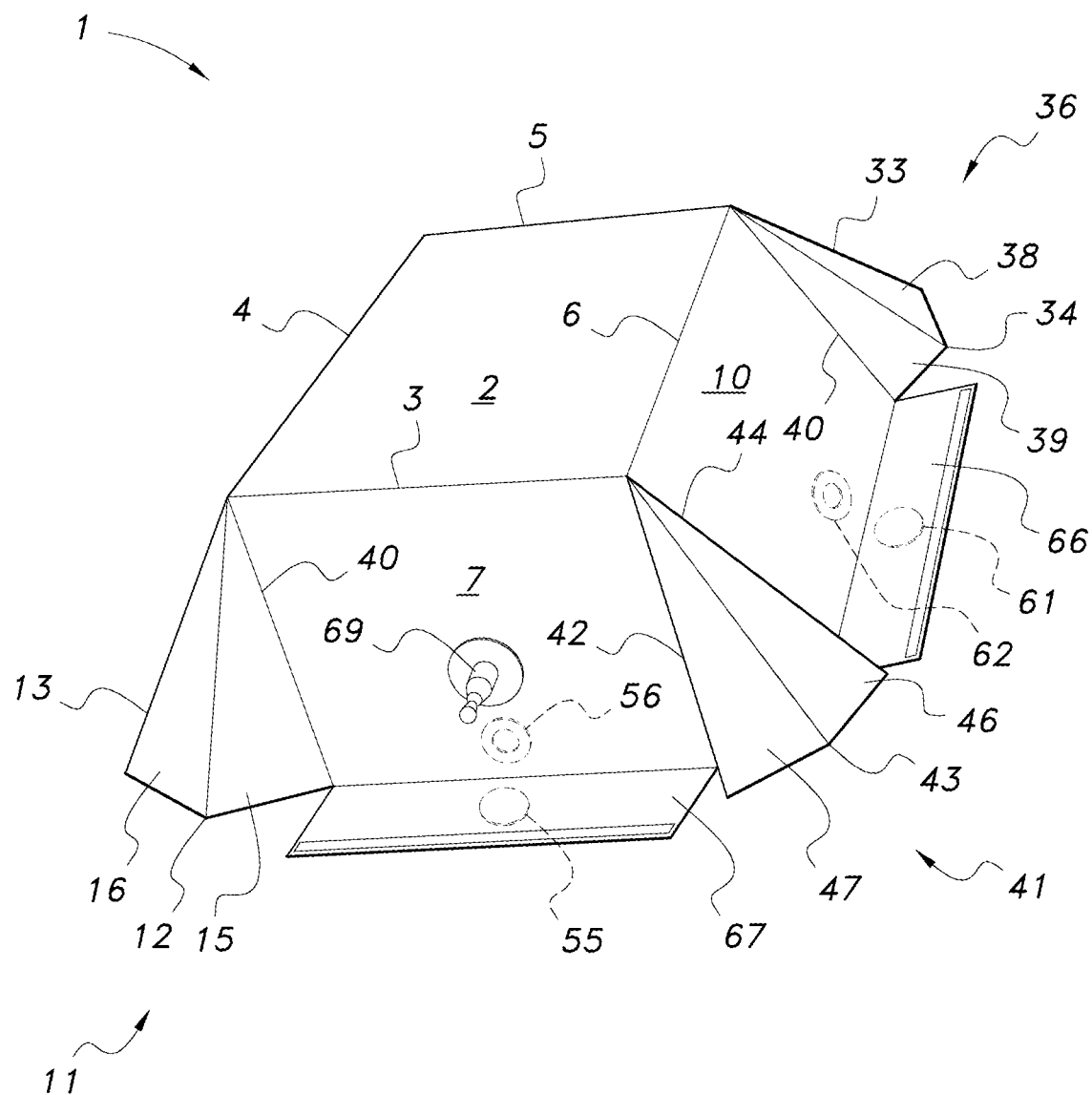
FIG. 2 shows the flat pack container of FIG. 1 from an underside view and partially folded.

FIG. 2 shows the flat pack container 1 of FIG. 1 from an underside view and partially folded.

Figure 3:
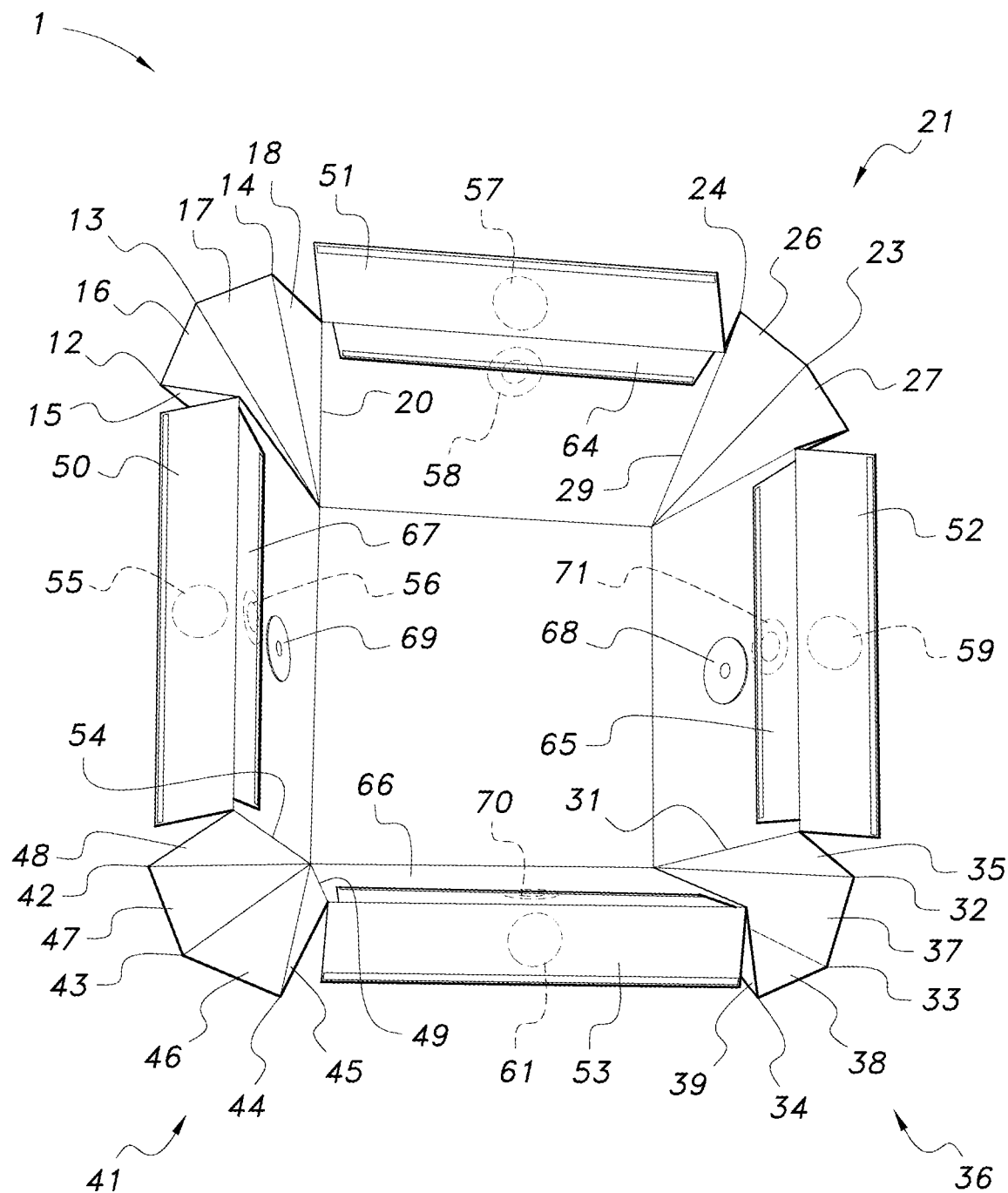
FIG. 3 shows the flat pack container of FIG. 1 from a top perspective view and partially folded.

FIG. 3 shows the flat pack container 1 of FIG. 1 from a top perspective view and partially folded.

Figure 4:
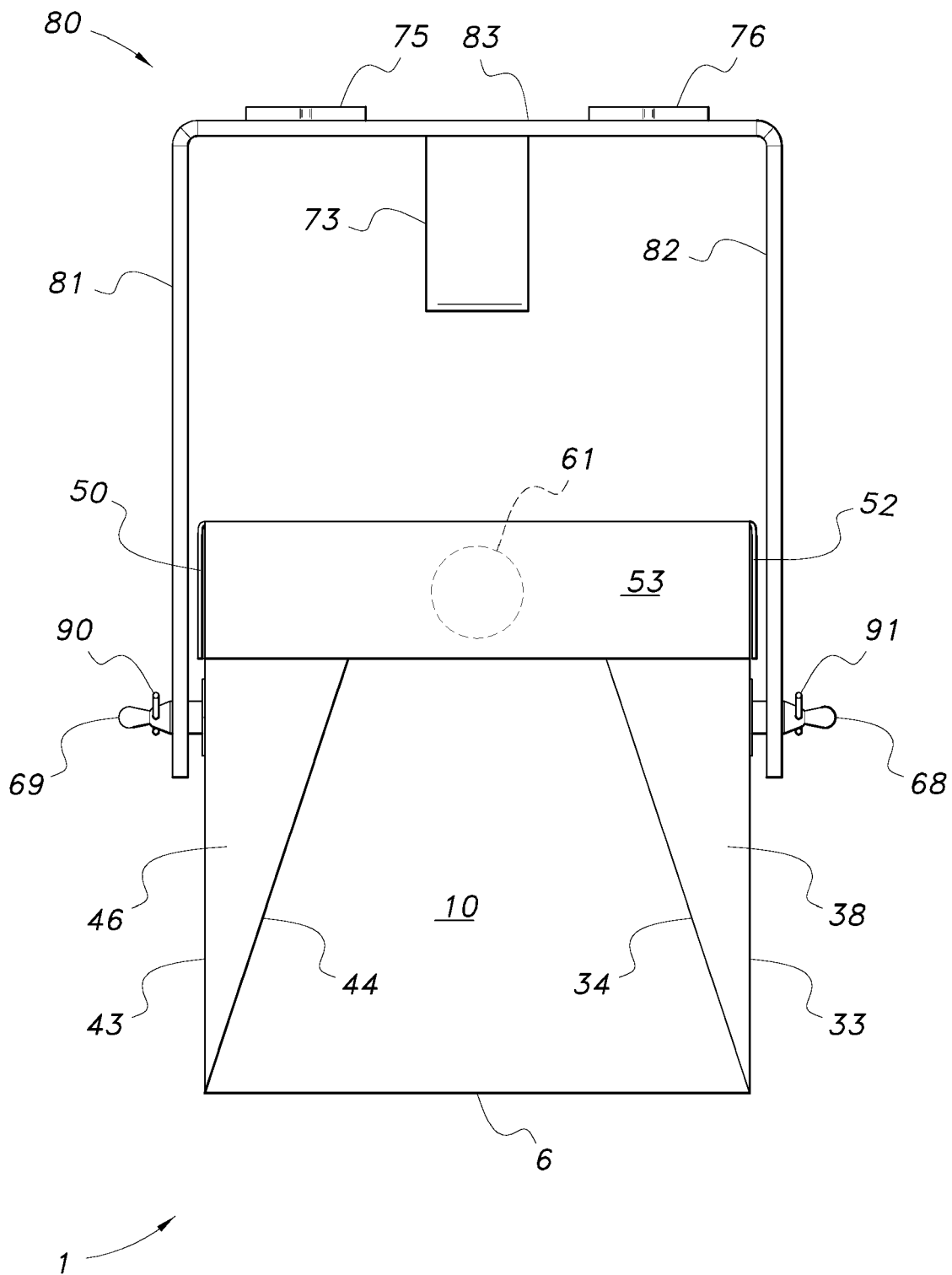
FIG. 4 shows a side elevation view of the flat pack container of FIG. 1 and fully folded with handle.

FIG. 4 shows a side elevation view 1 of the flat pack container of FIG. 1 and fully folded with handle.

Figure 5:
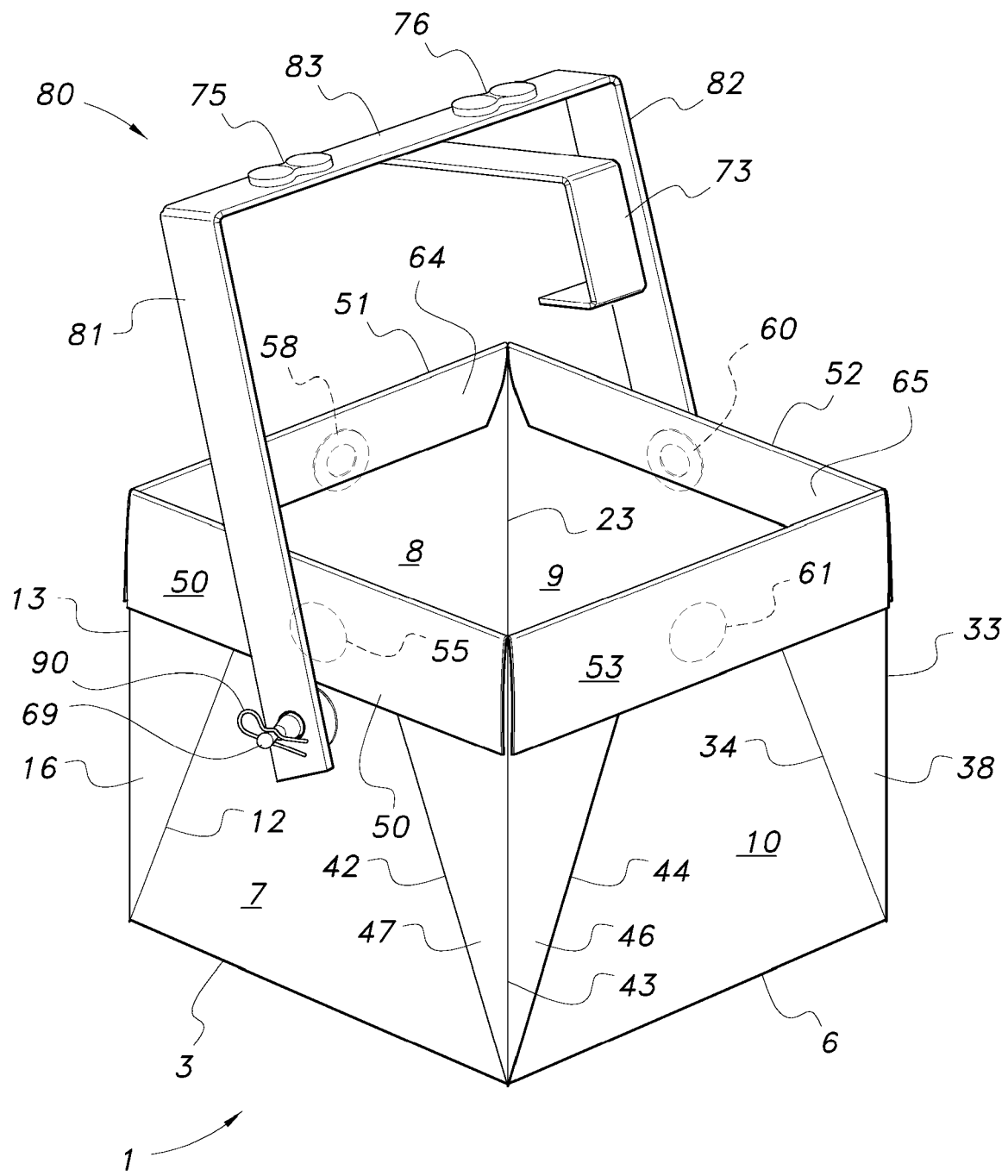
FIG. 5 shows a perspective view of the flat pack container of FIG. 1 in a folded condition with handle and liner inside ready to use.

FIG. 5 shows a perspective view 1 of the flat pack container of FIG. 1 in a folded condition with handle and liner inside ready to use.

Figure 6:
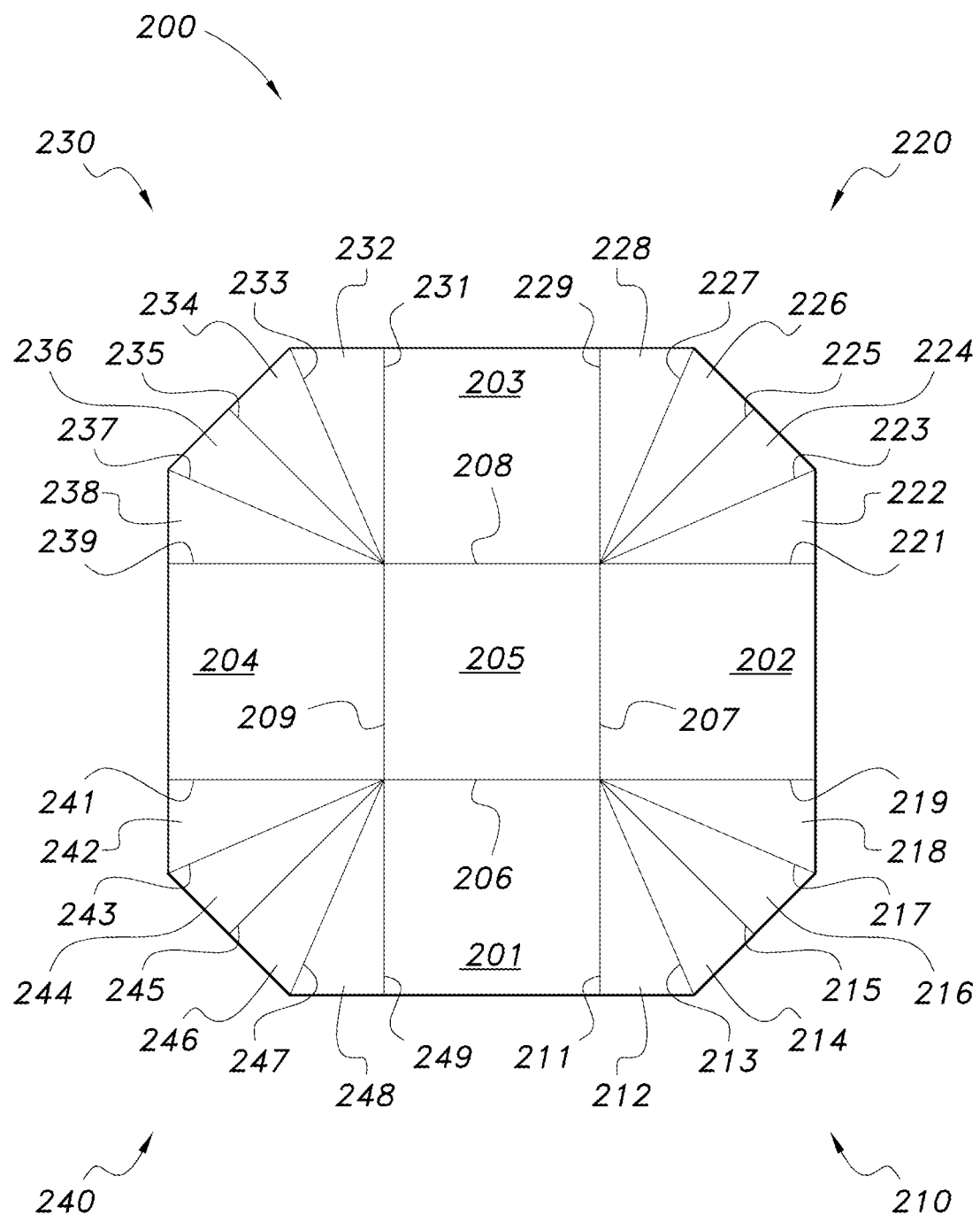
FIG. 6 is a plan view of a liner used with the present invention.

FIG. 6 is a plan view of a cellophane liner 200 used with the present invention. The liner 200 has four corner regions 210, 220, 230, and 240, and is very similar to FIG. 1 since the liner 200 will line the container of FIG. 1 in use. The liner 200 has a base 205, and walls 201, 202, 203, and 204. Fold lines 206, 207, 208, and 209 are shown adjacent the base 205. The region 220 has panels 222, 224, 226, and 228 connected by respective fold lines 221,223, 225, 227, and 229.

Similarly, region 210 has panels 212, 214, 216, and 218 connected by respective fold lines 213, 215, 217, and 219. The region 230 has panels 232, 234, 236, and 238 connected by respective fold lines 231, 233, 235, 237 and 239. Likewise, the region 240 has panels 242, 244, 246, and 248, connected by respective fold lines 241, 243, 245, 247, and 249.

Figure 7:
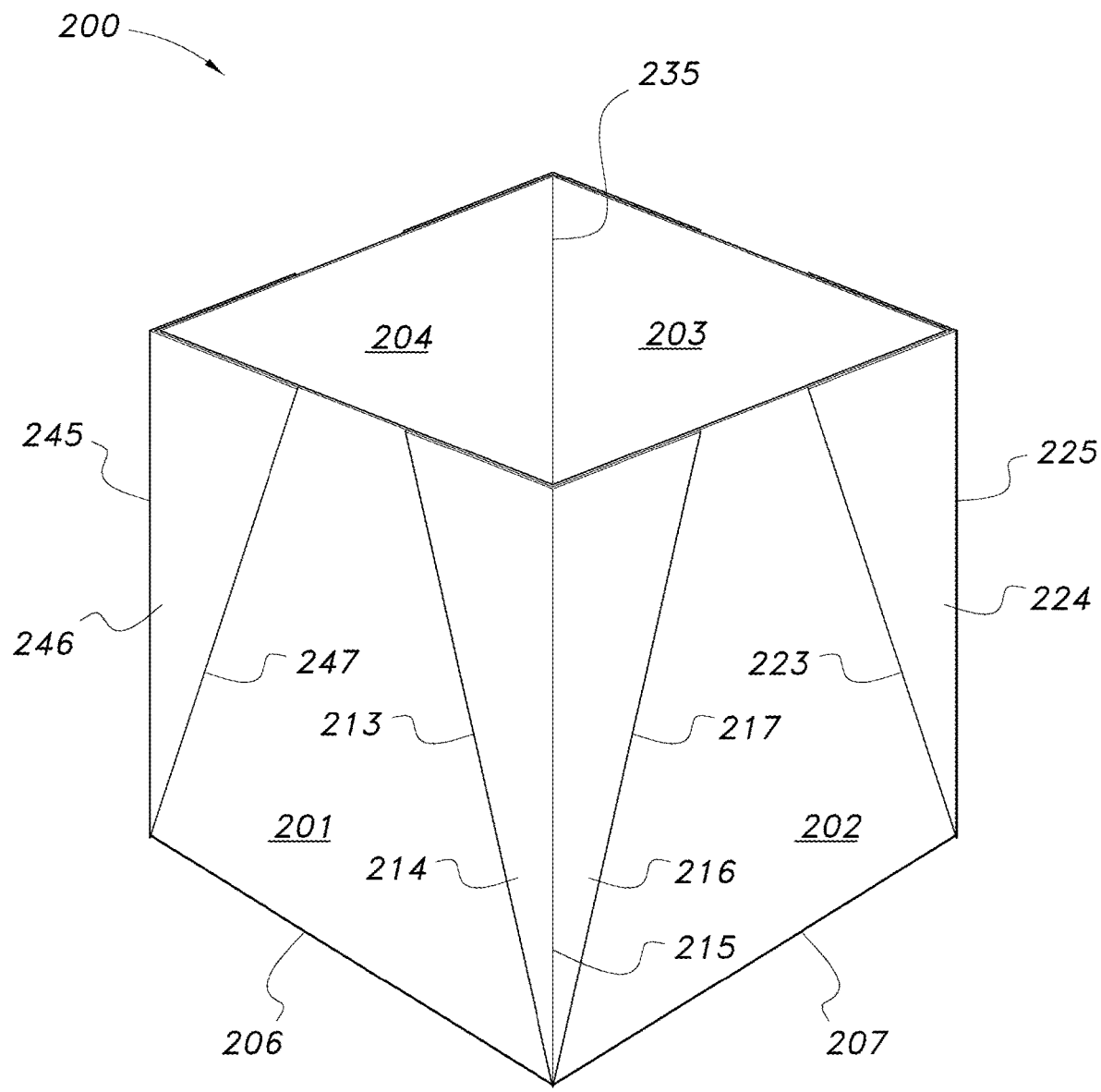
FIG. 7 is a perspective view of the liner of FIG. 6 is a folded condition.

FIG. 7 is a perspective view of the cellophane liner 200 of FIG. 6 is a folded condition.

Referring to FIG. 1 there is shown a top plan view of a flat pack container 1 in an open, unfolded state according to one embodiment. Container 1 comprises a base 2 bounded by peripheral edges 3, 4, 5 and 6 which are fold lines about which walls 7, 8, 9, and 10 are folded about the base 2.

Located between walls 7 and 8 is a radial corner region ii which comprises radial fold lines 12, 13 and 14 defining pleated sectors 15, 16, 17 and 18. When wall 7 and wall 8 are both folded in the direction of base 2, the above-noted sectors bunch together as shown in FIGS. 2 and 3.

Sector 15 is connected to wall 7 via fold line 19 and sector 18 is connected to wall 8 via fold line 20. As walls 7 and 8 are urged towards base 2, sectors 15 and 18 are dragged with walls 7 and 8. The user can manually fold sectors 16 and 17 about fold lines 12, 13 and 14, enabling a corner of the container 1 to be formed. Located between walls 8 and 9 is a radial corner region 21 which comprises radial fold lines 22, 23 and 24 defining pleated sectors 25, 26, 27 and 28. When wall 8 and wall 9 are both folded in the direction of base 2, those sectors bunch together. Sector 2 is connected to wall 8 via fold line 29 and sector 28 is connected to wall 9 via fold line 30.

As wall 8 and wall 9 are urged towards base 2, sectors 25 and 28 are dragged with walls 8 and 9. The user can manually fold sectors 26 and 27 about fold lines 22, 23 and 24 enabling a corner of the container 1 to be formed.

Located between walls 9 and 10 is a radial corner region 36 which comprises radial fold lines 32, 33 and defining pleated sectors 35, 37, 37 and 39. When wall 9 and wall 10 are both folded in the direction of the base 2, sectors bunch together. Sector S is connected to wall 9 via fold line 31 and sector 39 is connected to wall 10 via fold line 40. As wall 9 and 10 are urged toward base 2, sectors 35 and 39 are dragged with walls 9 and 10. The user can manually fold sectors 37 and 38 about fold lines 32, 33 and 34 enabling the container 1 to be formed.

Located between walls 10 and 7 is a radial corner region 41 which comprises radial fold lines 42, 43 and 44, defining pleated sectors 45, 46, 47 and 48. When wall 10 and wall 7 are both folded in the direction of base 2, the above-noted sectors bunch together. Sector 45 is connected to wall 10 via fold line 49 and sector 48 is connected to wall 7 via fold line 54. As wall 7 and 10 are urged towards base 2, sectors 45 and 48 are dragged with walls 7 and 10. The user can manually fold sectors 46 and 47 about fold lines 42, 43 and 44, enabling a corner 41 of the container 1 to be formed. The outer flaps/tabs 50, 51, 52 and 53 have respective metal discs 55, 57, 59 and 61 attached which respectively secures the corner pleats when the corner is formed. The respective metal discs on the respective flaps attach to the magnet inside the grommet 56, 58, 71 and 70 on the above-noted side walls. The bucket or container 1 also has four internal retaining flaps 64, 65, 66, and 67 which have wire inserts 85, 86,87 and 88, which respectively connect to the respective magnets in the grommets with the liner trapped between. To effect locking of the walls and corners once folded, tab 50 and wall 7 are provided with opposing cooperating magnets 55 attaching to 56 with a magnet inside a grommet, and wherein the grommet is stamped optionally with the logo of Magnetic Bucket (or any other logo, or with no logo at all). It secure pleats 18 and 48 between tab 50 and wall 7. Tab 51 and wall 8 have cooperating magnets 57 attaching to 58 with magnets inside the grommet. A similar cooperation occurs between wall 9 and tab 52 and wall 10 and tab 53, wherein elements 68 and 69 are the screws and it can only appear inside the bucket to attach the female ball stud 80 outside the bucket with washer 81 included to hold the detachable/ magnetic handle.

FIG. 2 shows with the corresponding numbering the flat pack container 1 of FIG. 1 from an underside view with corners 11, 41 and 36 partially folded. It shows female ball stud 80 with a washer 81 to attach the handle. Also this figure shows the magnets 56 and 70 locking by circlips 82 and 83.

FIG. 3 shows with corresponding numbering the flat pack container of FIG. 1 from top perspective view and partially folded. This view can include the paper or cellophane liner shown in FIGS. 6 and 7, or can include adhesively attached layers of liner portions to completely cover the interior surface exposed to liquid, as explained in detail further below.

FIG. 4 shows with corresponding numbering an elevation view of the flat pack container of FIG. 1 from a top perspective view and fully folded, and also shows a handle 80 having arms 81 and 82 supporting a connecting member 83. A hook portion 73 extends from the connecting member 83. The handle 80 is attached to the sides 7 and 9. The connecting member 83 supports magnets 75 and 76 on the top thereof.

FIG. 5 shows with the corresponding numbering a perspective view of the flat pack container of FIG. 1 in a folded condition ready to use.

FIG. 5 also shows how the magnetic handle 80 is attached to the ball studs 70 locked by r-clips 90 the same thing on the other end of the handle.

FIG. 6 shows the paper or cellophane in a folded view ready to fit inside the bucket and the second figure is a flat pack ready to lain over to the unfolded bucket and assembled together with internal flaps retaining the upper perimeter of the liner by way of magnet attaching the wire inserts.

FIG. 7 shows the paper or cellophane liner in a fold pack ready to put inside the fully-folded container ready to use.

The face formed by inner surfaces of the base 2 and walls 7, 8, 9 and 10 is preferably lined with a plastic impermeable liner allowing fluids to be held in the container. The container can form a bucket initially presented flat with integrated liners on the inner surface and an outer skin.

Transformation from the flat pack form to a cuboid form is by folding along pleats as described. On assembly it becomes a waterproof, rigid container with the capacity to be reused many times without needing to be cleaned between uses. Replacement liners are manufactured from different materials, i.e. water based, solvent based, heavy and weight film or other suitable materials. Preferably, the liners are constructed from lightweight recycled plastic or other suitable materials. The container 1 with integrated lines can be die cut, sonically welded or injection moulded.

Alternatively the container 1 can be pressure or vacuum formed.

An advantage of the foldable flat pack is that it can be stacked flat and assembled in a very short time. It is equipped with a handle for carrying, containing magnets 75 and 76 as shown in FIG. 4 so that it can be stacked on a shelf, a top surface, a roof, or on other flat surfaces and/or steel surfaces. From a flat pack, within 30 seconds a container can be formed with a versatile handle (see FIG. 4 and FIG. 5). Rigidity is ensured by a simple magnetic locking system or other various fasteners like ball stud 70 and locked by circlips 90 (see FIG. 5).

Figure 8:
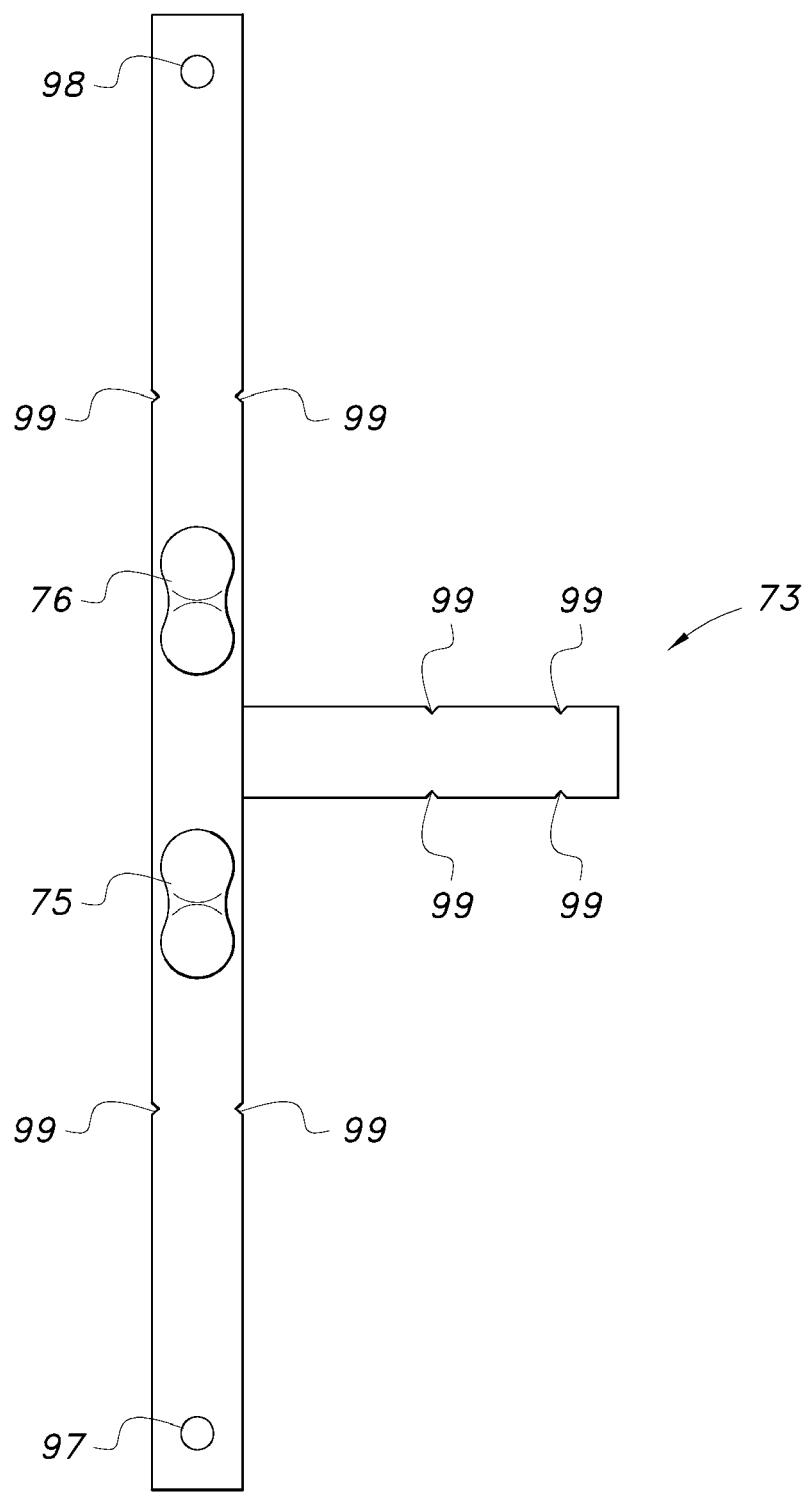
FIG. 8 shows the handle in a flat form, which is adapted to be folded for use.

As shown in FIG. 8, the handle 80 has holes on both ends 97 and 98 to attach on the ball studs, and also it has eight V-notches 99 for bending options, i.e., to enable a user to customize the handle by bending it in the locations where the notches are.

Figure 9:
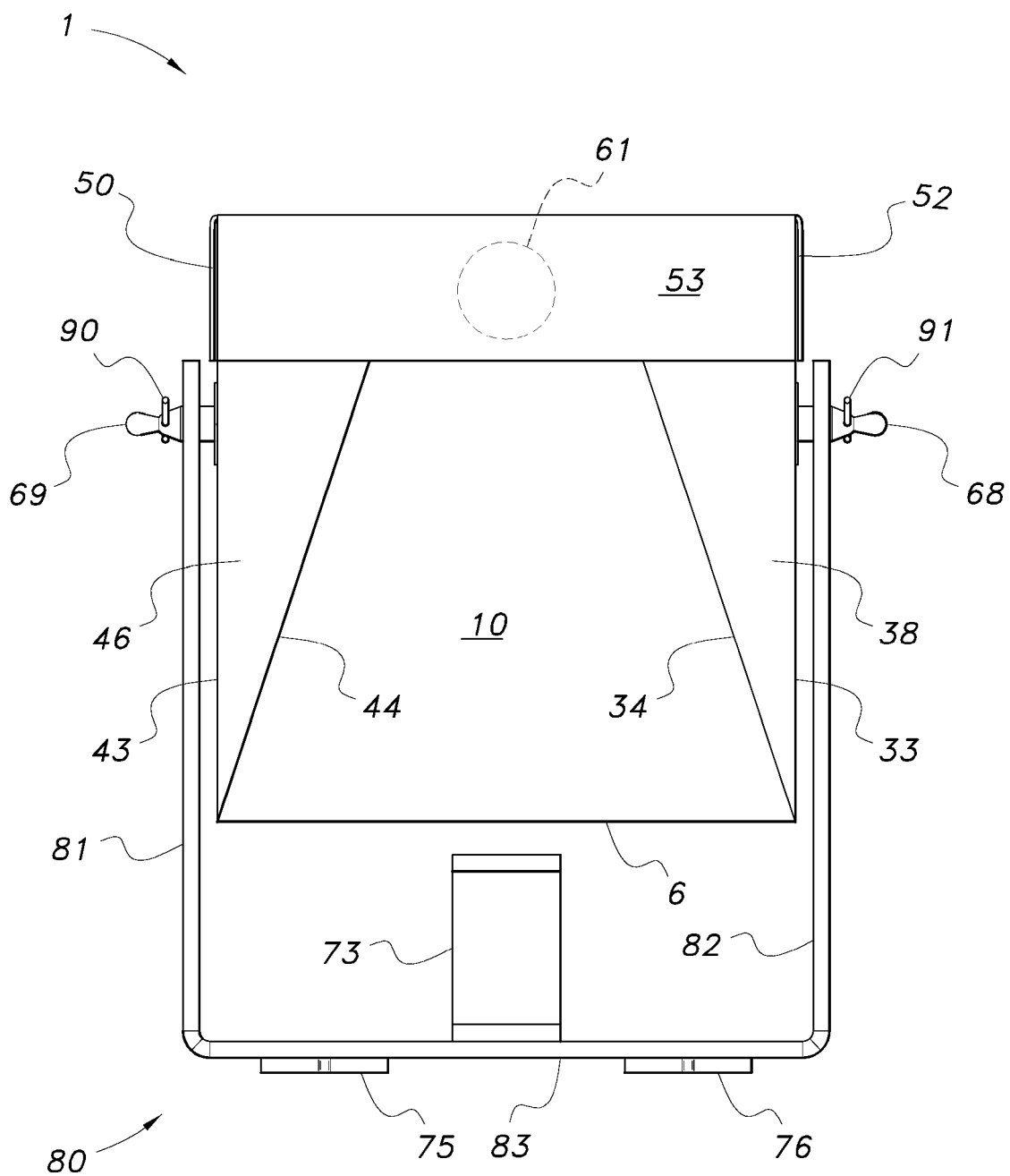
FIG. 9 is similar to FIG. 4, and shows the handle underneath the bucket, so that the magnets are on the bottom to secure the handle to a magnetic surface, so that the bucket itself sits upright as shown in this view.

FIG. 9 is similar to FIG. 4, but shows the handle 80 underneath the bucket, so that the magnets 75 and 76 are on the bottom. This configuration allows the magnets 75 and 76 to secure the handle 80 to a magnetic surface, so that the bucket itself sits upright as shown in this view.

The handle 80 is according to this embodiment offset and cantilevered to allow full access to the contents of the bucket 1 whilst reducing stress upon the user's hand and arm. The handle 80 enables adaption to belts, harnesses, ladders or other support by the T-bar 73. The magnetic handle enables the container to self level in 30 degree iron roofs and easily holds suspended 1 litre of paint on a vertical iron surface and forms an overhead iron scaffold. The T-bar handle is double V-notched to enable the end user to form it for themselves. FIG. 4 also shows the flat handle ready to bend and assemble with V-notches.

Figure 10:
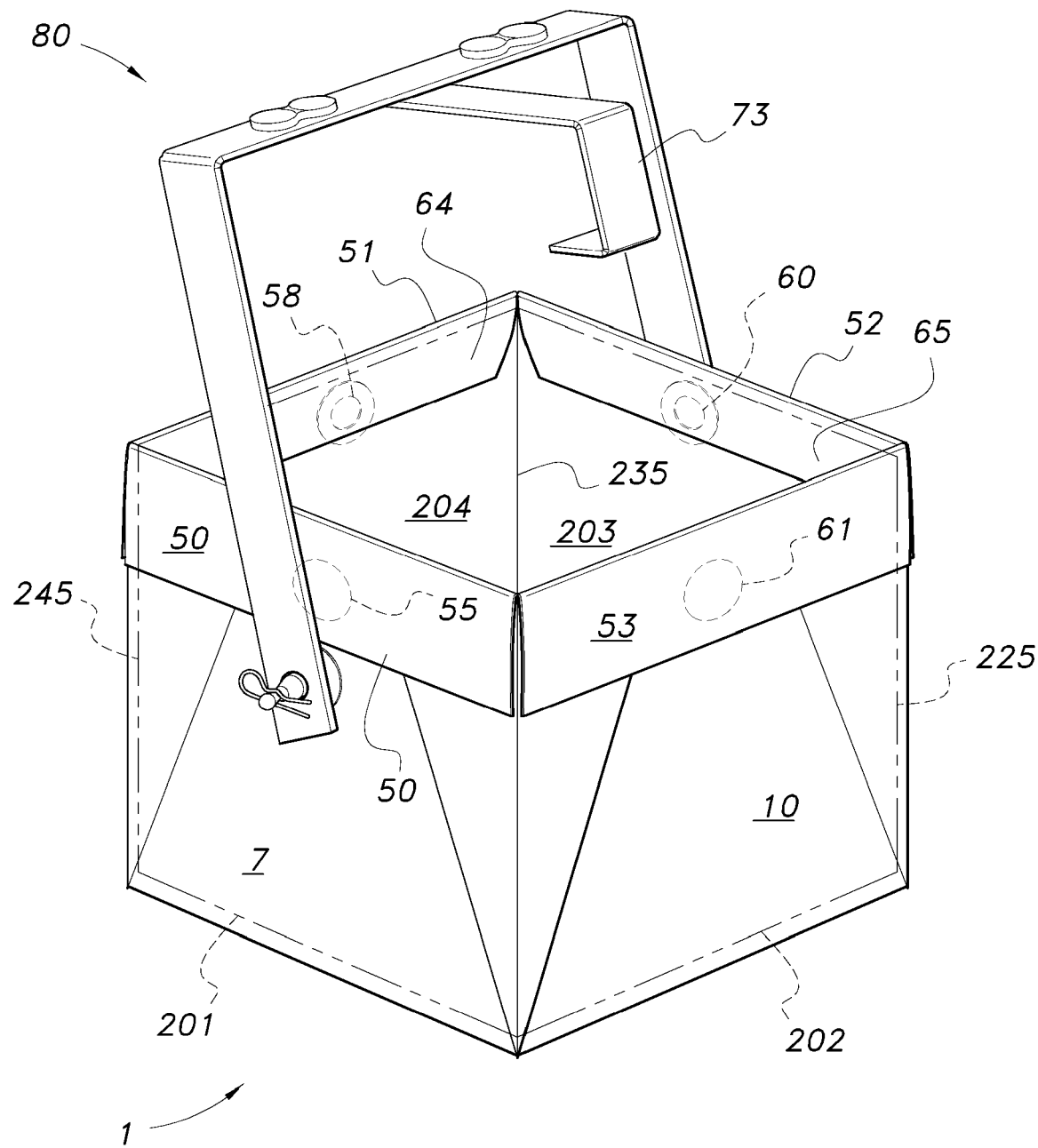
FIG. 10 is a perspective view of the assembled container showing the various hidden features in dashed outline.

FIG. 10 is a perspective view of the assembled container 1 showing the various hidden features in dashed outline. The parts shown are the same, and have the same numbering, as those of the previous figures, and reference is made to the foregoing discussion as well as to FIGS. 1-9 discussed above.

According to one embodiment, the inner surface of the container is adapted with a plurality of liners which can be peeled back and discarded after each use exposing a new liner for the next use. This eliminates cleaning between uses. The container is useful in circumstances where paint is supplied in large containers such as those used by tradespeople where paint must be transferred from a large supply container to a smaller container use in painting. Container 1 can function as a roller tray and for this purpose the dimensions are adapted for each particular type of use.

The examples referred to herein are illustrative are not to be regarded as limiting the scope of the invention. While various embodiments of the invention have been described herein, it will be appreciated that these are capable of modification, and therefore disclosures here are not to be constructed as limiting of the precise details set forth, but to avail such changes and alterations as falling within the purview of the description. Although the method and apparatus aspects of the invention will be described with reference to each application to a container for holding flowable substances, such as but not limited liquids, it will be appreciated that the invention has alternative applications.

It should be understood that the various changes and modification to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A flat pack container capable of formation by folding, comprising:
    a flat panel of foldable material to form a container body, the flat panel comprising an inner surface and an outer surface;
    a first portion of the flat panel capable of forming a base of the container and having at least one peripheral fold line;
    a second portion extending from the at least one peripheral fold line, which cooperates with the base to form a wall of the container body, wherein the wall of the container body includes at least two foldable pleated regions which enable the wall to be set in upright attitude to define with the base an internal space, the second portion further comprising flaps which retain the container in its folded configuration;

wherein each flap includes a magnet keeper which cooperate with magnets on an adjacent wall panel; and wherein the inner surface of the panel has a plurality of liners which can be peeled away after use exposing a fresh liner.

2. A container according to claim 1, further comprising inner flaps with wire inserts disposed on four walls and fold over the removable plastic liner and grip the back of the magnets within the metal grommets, thus retaining the liners against the inner peripheral edges of the container.

3. The container according to claim 2, further comprising a detachable flat metal cantilevered handle which is adapted to be folded; said handle having a magnetic section which has a strength sufficient to be capable of suspending 1 liter of liquid on an overhead, vertical or inclined magnetisable surface; said handle being adapted to be hung on a belt or on a ladder.

* * * * *